United States Patent
Carraway et al.

[11] 3,815,109
[45] June 4, 1974

[54] MINIATURE MULTICHANNEL BIOTELEMETER SYSTEM

[75] Inventors: John B. Carraway, Glendale; Joe T. Sumida, Los Angeles, both of Calif.

[73] Assignee: The United States of America as represented by the Administrator of the National Aeronautics and Space Administration, Washington, D.C.

[22] Filed: July 5, 1972

[21] Appl. No.: 269,073

[52] U.S. Cl........... 340/207 R, 128/2.1 A, 325/113, 325/141, 340/183, 340/203
[51] Int. Cl.............................................. G08c 19/16
[58] Field of Search.................... 340/207, 203, 183; 128/2.1 A; 325/113, 141

[56] References Cited
OTHER PUBLICATIONS

"An Eight Channel Micropowered PAM/FM Biomedical Telemetry System," Olsen et al., NTC, 1971, Record.

"A Multichannel Telemetry System for Use in Exercise Physiology," Skutt et al., IEEE, BME–17, No. 4, Oct. 1970.

*Primary Examiner*—Donald J. Yusko
*Assistant Examiner*—Robert J. Mooney
*Attorney, Agent, or Firm*—Monte F. Mott; John R. Manning; Paul F. McCaul

[57] ABSTRACT

A miniature multichannel biotelemeter system includes a transmitter unit in which signals from different sources are sampled to produce a wavetrain of pulses in which sample pulses of all the signals are separated by sync pulses. The pulses amplitude modulate a radio frequency carrier which is received at a receiver unit. Therein the sync pulses are detected by a demultiplexer which routes the pulses from each different source to a separate output channel wherein the pulses are used to reconstruct the signals from the particular source.

11 Claims, 6 Drawing Figures

MINIATURE MULTICHANNEL BIOTELEMETER SYSTEM

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention generally relates to biotelemetry and, more particularly, to a miniature multichannel biotelemetry system for monitoring biological parameters of a biological subject, that is not restricted by wires connecting the subject to monitoring equipment.

2. Description of the Prior Art

The remote measurement of biological parameters from animals and humans is an important requirement in many fields of biomedical research. Behavioral data from animals, clinical data from patients, and physiological data from implanted sensors are immediate examples. Phenomena to be measured include pressure, temperature and various biopotentials which may vary from microvolt neural impulses to myopotentials, e.g., muscular signals, in the tens of millivolts.

For such measurements to be most meaningful and useful, it is important that the biological subject (patient or animal) be able to move freely and not be restrained by any leads or wires which carry the signals to the monitoring or recording device. Also, it is important that the subject be isolated from power signal pickup and shock hazard. In addition since the detected signals are in many instances of extremely low levels, maximization of signal-to-noise ratio and signal fidelity are primary requirements of any useful system.

Heretofore in most systems designed to measure and record biological parameters the signal pickup devices, such as electrodes which are fastened to or inserted in the subject, are connected to the monitoring or recording device by relatively long flexible leads. Consequently, they greatly restrict the subject's movement. In addition, the presence of long wires causes unwanted signal pickup and cable flex artifacts that account for reduced signal to noise ratio and reduced signal fidelity. Some systems employ wireless transmission of the signals from the subject to the recording device. However, due to the techniques employed therein the number of channels, i.e., the number of parameters which can be monitored simultaneously is very low, and signal bandwidth is very limited. In addition power consumption is high, and the size and weight of the transmitting unit on the subject are large. Consequently, they often encumber even large subjects, such as patients, and large animals and are completely useless for use with small animals, such as laboratory rats, which are used very extensively in medical research. A need therefore exists for a new system for monitoring biological parameters which is not limited by the disadvantages of the prior art.

OBJECTS AND SUMMARY OF THE INVENTION

It is a primary object of the present invention to provide a new improved biotelemetry system.

Another object of the invention is to provide an improved multichannel biotelemetry system with wideband channel characteristics.

A further object of the present invention is to provide a miniature light weight multichannel telemeter transmitter unit, connectable to a subject including small laboratory animals, for receiving biomedical parameters from a plurality of sources in the subject, including wideband parameters and for wirelessly transmitting them to a remotely located receiver unit.

Yet, a further object of the present invention is to provide a highly reliable and adaptable low-power-consuming miniature, light weight transmitter unit which is adapted to be carried by an unrestricted motion-free subject including a rat-size subject to transmit through a plurality of channels biological parameters including at least some wideband parameters from the subject and for wirelessly transmitting the parameters to a receiver unit.

These and other object of the invention are achieved by providing a miniature transmitter unit in which biological parameters, hereafter also referred to as physiological signals, received from different sources of a subject are separately band limited and amplified in individual channels, matched to each source's characteristics. The bandlimited and amplified signals in the various channels are sequentially sampled by a miniature sequencer and gating arrangement to provide amplitude modulated pulses representing signal samples. The sampling rate is chosen as a function of the highest frequency of interest of any of the physiological signals. The data samples together with sync pulses form an amplitude modulated composite wavetrain of pulses which frequency modulates a radio frequency carrier which is transmitted by a transmitter to a receiver unit. Therein the pulses in the composite wavetrain are detected to separate the pulses representing the samples received from each channel in the transmitter unit and to reconstruct the original signals from the different sources. By employing monolithic chip components, low power digital logic and hybrid mounting techniques the size and weight of the transmitter unit are reduced to low values so that the unit can be connected to a very small subject, e.g., a laboratory rat without encumbering it or in any way limiting its freedom of movement.

The novel features of the invention are set forth with particularity in the appended claims. The invention will best be understood from the following description when read in conjunction with the accompanying drawings.

BRIEF DESCRIPTION OF THE DRAWINGS

FIG. 2 is a waveform diagram useful in explaining the sampling operation of the transmitter unit;

DETAILED DESCRIPTION OF THE PREFERRED EMBODIMENTS

Figure 1:
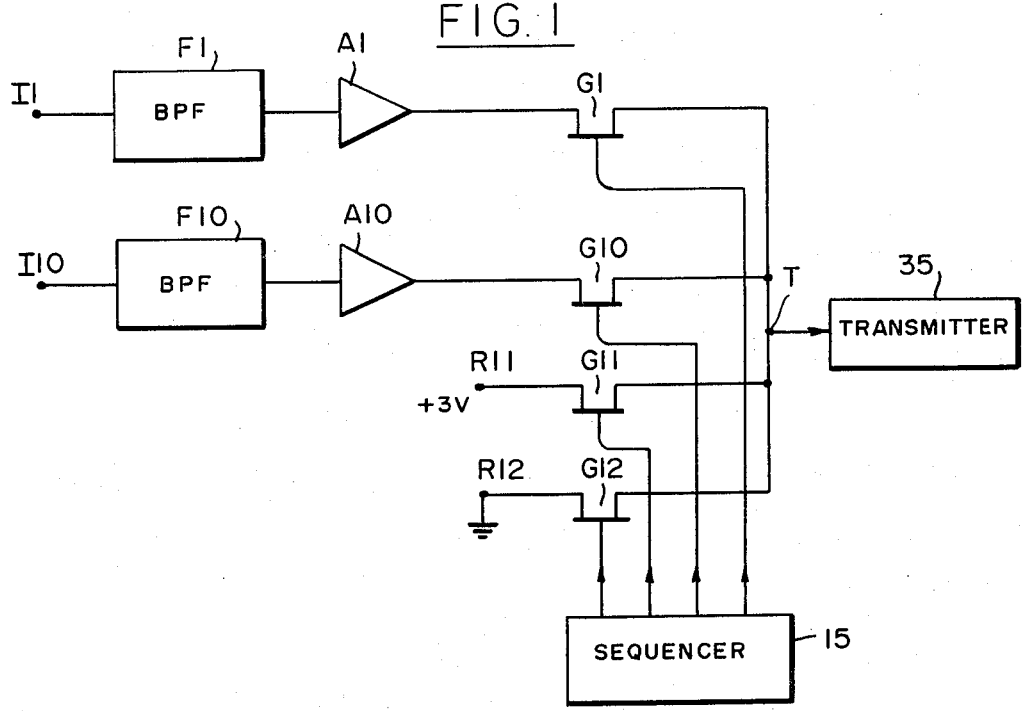
FIG. 1 is a block diagram of the transmitter unit of the present invention.

The present invention will be described in connection with a 10-channel system, although as will be appreciated from the description, the invention may incorporate any number of channels other than 10. FIG. 1, to which reference is made, is a simplified diagram of the transmitter unit of the 10-channel system. Therein only channels 1 and 10 are shown. Channel No. 1 includes a bandpass filter F1 connected between an input terminal I1 and an amplifier A1, whose output is connected through a gate G1 to an output terminal T. In operation input terminal I1 is connected to a source of physiological signals, such as a brain cell, muscle, etc. The frequency band of the filter F1 is chosen depending on the particular source characteristics and the frequency band of the signals of interest therefrom. These signals are amplified by amplifier A1 by a selected gain which is a function of the expected amplitude of the unamplified signals from the source connected to I1. Similarly, channel 10 consists of an input terminal I10, a bandpass filter F10, an amplifier A10 and, a gate G10 which is also connected to output terminal T. Likewise, gates G2-G9 (not shown) associated with channels 2 through 9 are connected to output terminal T.

In addition to gates G1-G10 the transmitter unit also includes a gate G11 which connects an input reference terminal R11 at which a selected potential level, e.g., +3v is assumed to be applied, to output terminal T. Another gate G12 connects a grounded reference terminal R12 to output terminal T. Each of the gates is a field-effect transistor or (FET) whose gate (G) electrode is connected to a sequencer 15. The latter controls the gates by sequentially enabling them so that at any time only one gate is enabled. During each period that gate G1 is enabled the potential at terminal T is the same as the output of amplifier A1. The potential amplitude and polarity define a pulse which represents a sample of the signal of channel 1 at the time of sampling. Similarly, the pulses at terminal T represent a sample of the signal in any of the other nine channels whenever any of gates G2-G10 is enabled. When gate G11 is enabled +3v is applied to terminal T to form a sync pulse while a ground potential pulse is formed thereat when gate G12 is enabled. As a result a composite wavetrain of pulses is formed at terminal T.

An example of the wavetrain of pulses at terminal T during three successive cycles C1-C3 of the sequencer 15 is shown in FIG. 2. Therein 21A, 21B and 21C designate 3 pulses corresponding to three samples of the signal in channel 1 when gate G1 is enabled during each of the three cycles. Similarly 22A, 22B, 22C through 30A, 30B, 30C designate three pulses corresponding to three samples of the signals in each of the other nine channels. Pulses 31A, 31B and 31C represent +3v sync pulses applied at terminal 10 when gate G11 is enabled during the three cycles, while 32A, 32B and 32C designate ground potential pulses applied to terminal 10 when gate G12 is enabled. Briefly, the function of the ground potential pulses is to serve as a reference level in the receiver unit for the signals which are reconstructed from the sample representing pulses. However, to simplify the following description these ground potential pulses will be ignored.

As seen from FIG. 2, the wavetrain of pulses includes a set of 10 pulses representing samples of the signals in the 10 channels between each pair of adjacent sync pulses, the wavetrain in essence comprises a pulse amplitude modulated (PAM) waveform at terminal T which is applied to a transmitter 35. Therein the amplitude and polarity of each pulse frequency modulates a radio frequency carrier which is transmitted by radio waves rather than through wires or leads to a remotely located receiver unit. Thus the technique of transmitting the signals by sampling them to form amplitude modulated pulses, which in turn frequency modulated the carrier, can be thought of or defined as pulse amplitude modulation/frequency modulation, designated as PAM/FM.

In the receiver unit the frequency modulated carrier is demodulated to detect the amplitude modulated composite waveform of pulses. The sync pulses such as 31A, 31B and 31C are used to control a switching network to route the pulses which represent the samples of the signals of each channel such as samples 21A, 21B and 21C, to a separate output channel including a hold amplifier and filter. Therein the original signal in each transmitter unit channel is reconstructed for monitoring and/or recording.

As is appreciated by those familiar with signal sampling in order to be able to reconstruct a signal from signal samples the original signal should be sampled at a rate which is at least twice its highest frequency. Thus in the present invention the sequence's frequency of operation is chosen as a function of the highest expected frequency of signals in any of the channels. In one embodiment, actually reduced to practice, with a highest expected signal frequency of 5 kHz, each signal was sampled at a rate of 20,000 samples per second, with the sequencer operating at a rate of $20,000 \times 12 = 240,000$ gate-enabling pulses per second.

It should be stressed that the transmitter unit of the present invention is capable of broadband signal transmission since it can accommodate broadband signals by merely raising the sampling rate of the sequencer. Also once the sequencer's sampling rate is chosen for the signal with the highest upper frequency limit all other signals may have similar upper frequency limit. For example with a sampling rate per channel of 20,000 samples per second theoretically each of the signals applied to each of the 10 channels may have an upper frequency limit of 10 kHz. Furthermore, the same transmitter unit may accommodate a signal with an upper frequency limit above 10 kHz merely by supplying the signal to more than one properly spaced channel so that during each cycle of the sequencer the same signal is sampled more than once. For example, a signal with an upper frequency limit of 20 kHz may be supplied to two channels separated by four channels such as chanels 1 and 5, so that even though each channel is sampled at 20,000 samples per second, since the signal is supplied to two channels, its effective sampling rate is 40,000 samples per second.

As seen from FIG. 1 each channel includes its separate bandpass filter and amplifier. This is particularly desirable since the signals coming from different sources may require different levels of amplification and be limited to different bandwidths. Thus signal conditioning tailored to each signal's characteristics can be achieved. Also by incorporating an amplifier in each channel the amplifier acts as an isolator between the source and the channel's gate to prevent switching transients from affecting the subject. Such transients can cause brain stimulation of the subject through electrodes implanted in the subject's brain.

One embodiment actually reduced to practice weighs only 16 grams and occupies a volume of 12 cc. (Including batteries). It provides 10 data channels each sampled at 20,000 samples per second and accommodates 10 signals with upper frequency limits of 5 kHz. A carrier frequency of 180 mHz which is within the commercial TV channel frequency band is used to transmit the pulses to the receiver unit over a narrow band of 2 mHz thereby reducing the system's susceptibility to noise. The particular carrier frequency is selected to enable an economical, commercially available tuner to be incorporated in the receiver unit.

Such wideband capability in a large number of channels is not easily possible in any telemetry system in which FM/FM is employed. In such a system the signals in the various channels frequency modulate subcarriers of different frequencies which are summed and which in turn frequency modulate a main carrier. To transmit a signal of 5 kHz bandwidth in one channel a subcarrier of 20 kHz is required. Higher frequency subcarriers would be required to transmit similar signals of the same bandwidth in the outer channels. As a result, an extremely high carrier frequency would be required in order to transmit the highest subcarrier frequency. Such a high carrier frequency would require a specially designed tuner. Also, it is possible that such a high carrier frequency would fall outside of the frequency band approved by the FCC for transmission. In addition, the transmitted bandwidth would have to be very wide thereby subjecting the system to noise.

Figure 3:
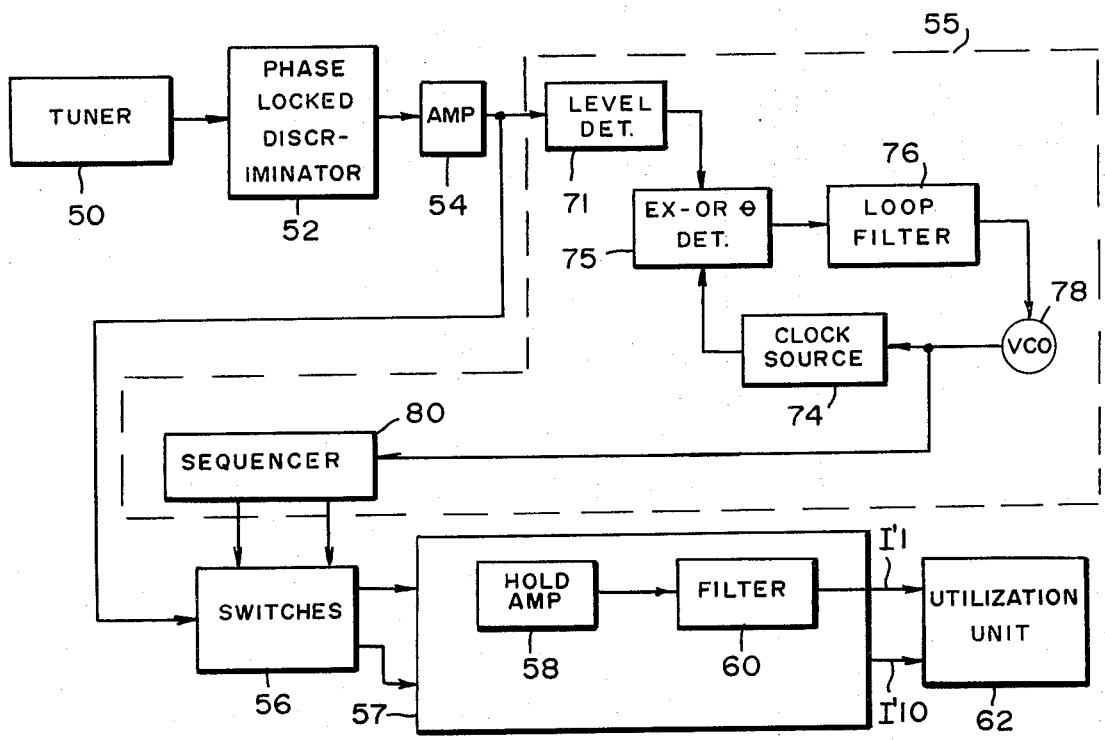
FIG. 3 is a block diagram of the receiver unit.

Attention is now directed to FIG. 3 which is a block diagram of the receiver unit which receives the carrier, frequency modulated by the composite wavetrain of pulses such as the train shown in FIG. 2. The receiver unit includes a tuner 50 and a phase lock discriminator 52 whose output is the composite wavetrain of pulses. These pulses are amplified by an amplifier 54 whose output is supplied to a demultiplexer 55 and solid state switches 56.

The latter are converted to output channels 57. In a 10-channel system (ignoring the ground potential pulses) 10 switches and 10 output channels are included. The 10 output channels include 10 hold amplifiers 58 and 10 filters 60, one amplifier and one filter per output channel. The switches 56 are controlled to route the pulses, representing samples received from each transmitter-unit input channel, to a particular output channel wherein they are held in the amplifier and smoothed by the filter to provide a replica of the original signal into the transmitter unit at one of the output terminals which are designated I'1–I'10. In operation pulses 21A, 21B and 21C from amplifier 54 are passed through one of the switches 56 to output channel 1 to produce at terminal I'1 a replica of the signal at terminal I1. Similarly, the input signals at terminals I2–I10 are reconstructed at output terminals I'2–I'10. The output terminals may be connected to any utilization unit 62 such as a monitoring or recording device.

Figure 4:
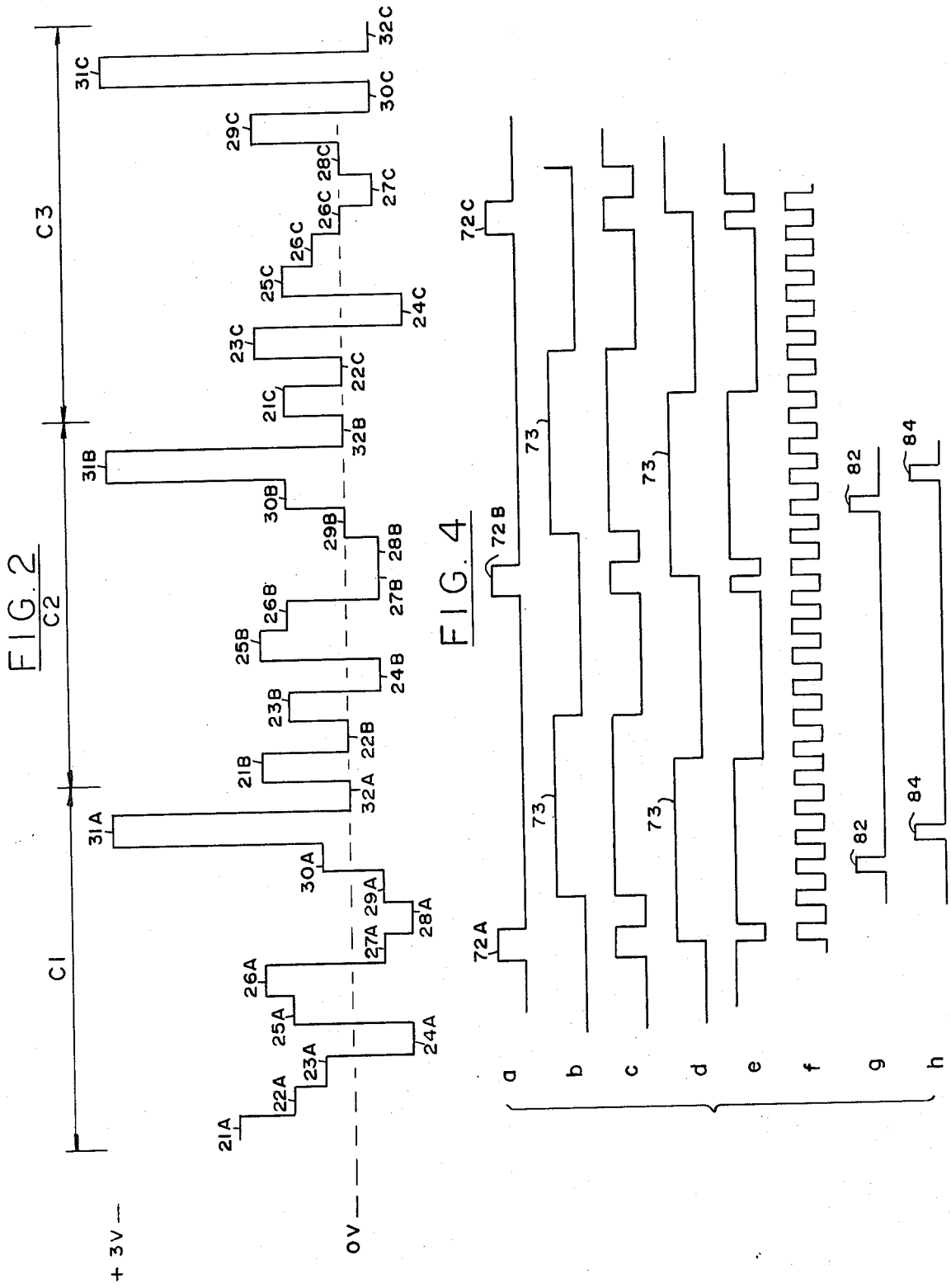
FIG. 4 is a multiline waveform diagram useful in explaining the operation of the receiver unit.

The switches 56 are controlled by the demultiplexer 55. It senses the sync pulses and in response thereto supplies controlling pulses to enable switches 56 so that pulses representing samples of the signal in each transmitter-unit channel are supplied to its corresponding output channel. As is appreciated by those familiar with the art of demultiplexing difficult techniques may be employed to use the sync pulses so as to control the switches 56 to route the 10 pulses between each pair of sync pulses to 10 different output channels. In an embodiment actually reduced to practice the demultiplexer 55 consists of a level detector 71 which senses the sync pulses. The amplitudes of the latter is chosen to be significantly higher than the amplitude of the largest possible sample pulse. The threshold level is set above the level of the largest expected pulse so that any pulse amplitude above that threshold level indicates a sync pulse. The output pulses of the detector 71 corresponding to sync pulses 31A, 31B and 31C are designated by numerals 72A, 72B and 72C respectively in line $a$ of FIG. 4. These sync pulses together with clock pulses 73 shown in lines $b$ and $d$ and derived from a clock source 74 are fed to an Exclusive-Or phase detector 75. The output of the latter is supplied to a loop filter 76. The filter output controls a VCO 78 whose frequency is 12 times the desired clock frequency, and is shown in line $f$.

Basically, the clock source 74 consists of a divide by-six circuit and a flip-flop which is set and reset by each sixth pulse from the VCO 78 to form the clock pulse square waveform, shown in lines $b$ and $d$. The output of the phase detector 75 is as shown in lines $c$ and $e$. As shown in line $b$, the clock pulse is not in synchronism (sync) with the received sync pulses. Consequently, the output of the detector 75 is not ON during half of each cycle or clock period and OFF during the other half of each cycle Therefore, the output of filter 76 is a net DC level which changes the VCO output until the leading edge of each clock pulse 73 coincides with the center of each of pulses 72A, 72B, etc., as shown in line $d$. Only then is the output of the phase detector ON for half a cycle period and OFF for half a cycle period as shown in line $e$ and the local clock pulses are in sync with the incoming sync pulses.

Once the clock pulses are synchronized with the incoming sync pulses the output pulses of the VCO 78 are supplied to a sequencer 80 (FIG. 3) which is similar to sequencer 15 except that of the former only 10 of the outputs are used to sequentially activate the 10 switches 56. The sequencer output pulses which are used to activate the switch associated with output channel 1 are shown in line $g$ and are designated by numerals 82 and those used to activate the switch associated with output channel 2 are shown in line $h$ and designated by numerals 84.

Figure 5:
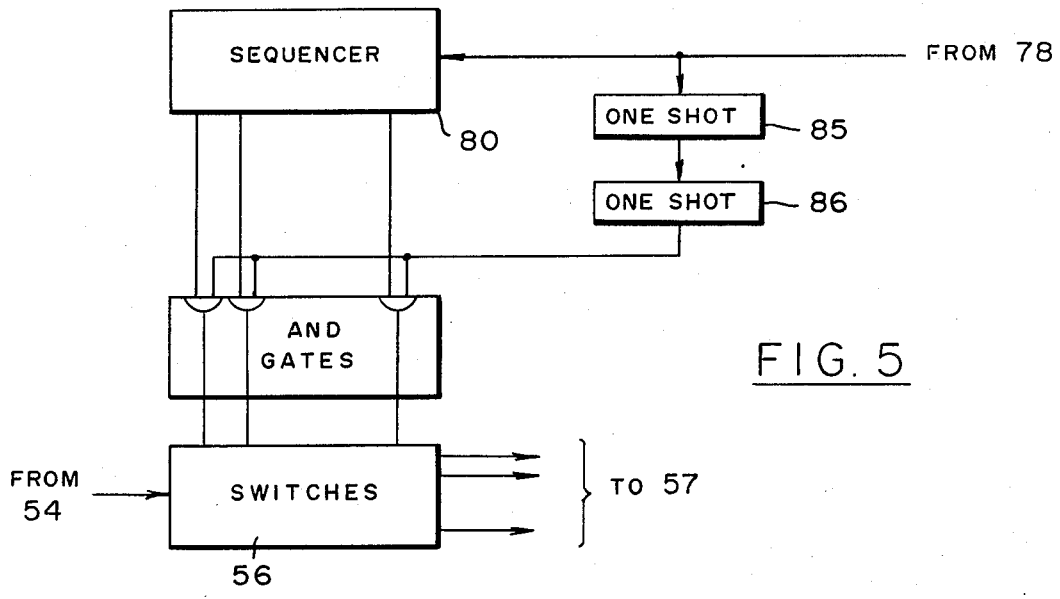
FIG. 5 is a partial block diagram of another embodiment of the receiver unit.

It should be pointed out that the local clock pulses are synchronized with the centers of the sync pulses. Also each enabling pulse to the switches is narrowed to less than a full input sample pulse width, to insure that each switch conducts only when the input sample which is to pass therethrough is present. The delay of the sample pulse to mid-period may be achieved by a delay oneshot 85 (see FIG. 5) and the narrowing of the enabling pulses to the switches may be achieved by one shot 86.

In this particular embodiment to prevent sample pulses associated with one channel from being diverted to adjacent channels during the switching instances of switches 56 it is desirable to pass through the switches only the central portions of the various sample pulses.

Figure 6:
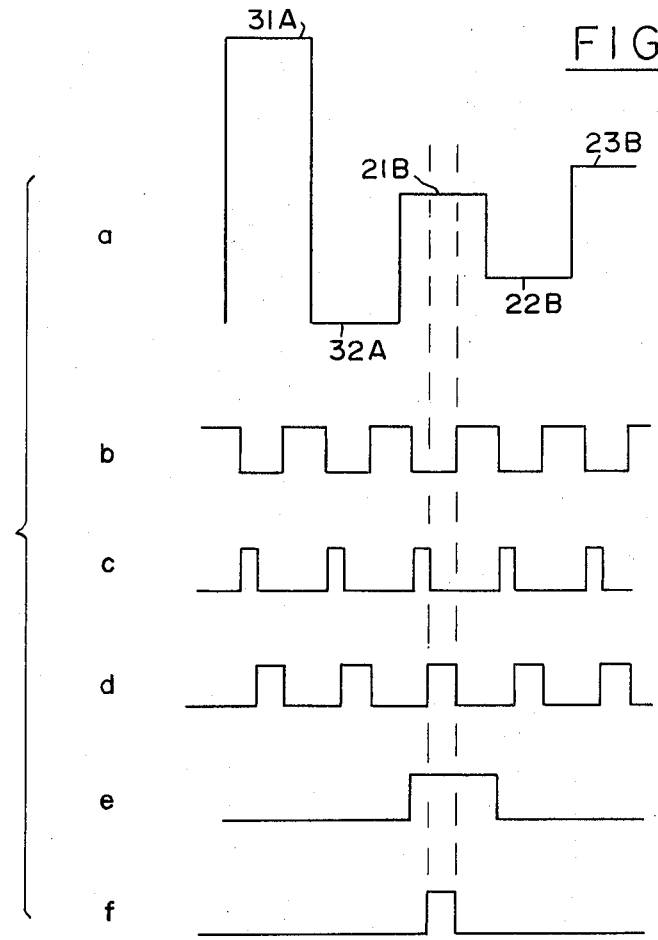
FIG. 6 is a multiline waveform diagram useful in explaining the function of the circuitry, shown in FIG. 5.

This is easily accomplished by controlling the delay provided by one shot 85 and the pulse width produced by one shot 86. Waveform timing associated with this aspect of the demultiplexer (55) may be summarized in connection with FIG. 6 wherein line a diagrams sync pulse 31A and telemeter input samples 21B, 22B and 23B. Line b shows the phase-locked VCO clock output (from 78). Line c shows the output of delay one shot 85 and line d shows the output of pulse width control one shot 86. Line e pictures the sequencer output corresponding to sample pulse number one. The sequencer output (line e) and the one shot output (line d) are anded to produce a narrow sampling switch enable pulse (line f) centered in reference to the telemeter sample pulse.

There has accordingly been shown and described herein a novel biotelemetry system for receiving a plurality of signals from a biological subject and for transmitting them by means of a radio frequency carrier to a remotely located receiver unit, wherein the original signals are reconstructed. By employing signal sampling to generate a pulse amplitude modulated wavetrain of pulses which in turn modulate the frequency of a radio frequency carrier, wideband signals can be transmitted over a relatively narrow bandwidth. By using present state of the art solid state devices, the transmitter unit size and weight can be minimized in order not to limit the complete freedom of motion of any biological subject.

Although particular embodiments of the invention have been described and illustrated herein, it is recognized that modifications and variations may readily occur to those skilled in the art and consequently it is intended that the claims be interpreted to cover such modifications and equivalents.

In the claims:

1. A multichannel biotelemetry system for transmitting physiological signals from a biological subject to a remotely located receiver unit, whereat the signals are reconstructed, the system comprising:

a transmitting unit adapted to be carried by said subject and including a plurality of signal channels, each adapted to receive physiological signals from said subject, a common terminal, means for sequentially sampling the signals in each of said channels and a predetermined potential level for producing at said common terminal a composite wavetrain of equal duration pulses which includes a set of pulses representing samples of the signals in all of said channels between successive synchronizing pulses of substantially said predetermined potential level, and transmitter means connected to said common terminal for transmitting radio carrier signals of a frequency which is modulated by the pulses in said composite wavetrain of pulses; and a remotely located receiving unit including means for receiving the frequency modulated radio carrier signals and for extracting the composite wavetrain of pulses therefrom, means responsive to the synchronizing pulses in said composite waveform of pulses for generating a sequence of equal duration local sync pulses, in time coincidence with substantially the midpoints of the pulses in said received composite wavetrain of pulses and of durations which are shorter than one-half the durations of the pulses in said received composite wavetrain of pulses, a plurality of output means associated with the channels in said transmitting unit and means for utilizing said local sync pulses to supply to each of said output means only portions of the received pulses representing samples of the signals in a different one of said channels in said transmitting unit, each of said output means providing an output corresponding to the signals in the channel with which it is associated.

2. In a system as described in claim 1 wherein said means for sequentially sampling, sample the signals in each channel at the same sampling rate which is a function of the upper frequency limits of the signals in said channels.

3. In a system as described in claim 1 wherein said means for sequentially sampling include a gate between each channel and said common terminal, and a gate between a source of said predetermined potential level and said common terminal, and a sequencer for sequentially enabling said gates to apply to said common terminal a potential of an amplitude and polarity which is a function of the signal in one of the channels when a gate connected to one of said channels is enabled or said predetermined potential level when the gate between the common terminal and said source is enabled.

4. In a system as described in claim 3 wherein at least one of said channels includes a filter for limiting the frequencies of the signals sampled when the gate connected to the channel is enabled to be not greater than one half the rate at which each of said gates is enabled.

5. In a system as described in claim 3 wherein each channel includes an input terminal at which signals from said subject are applied and a filter and amplifier connected in series between said input terminal and the gate associated with the channel, for filtering said signals at said input terminal so as to limit at least their upper frequency not to exceed one half the rate at which said gate is enabled and for amplifying the filtered signals by a selected amplification factor.

6. In a system as described in claim 3 wherein each of said output means in said receiving unit includes means for holding successive samples supplied thereto and a filter coupled to said means for holding to provide a smoothed output signal as a function of the samples in said means for holding.

7. A system as described in claim 6 wherein said means for utilizing said local sync pulses comprises a plurality of switchable gates and a sequencer for sequentially enabling said switchable gates so that successive samples from the same channel in said transmitting unit are successively supplied to the means for holding associated with the same channel.

8. A method of monitoring physiological signals from a biological subject that is unrestricted by wires extending from the subject to monitoring means, the steps comprising:

sampling in a subject-carried unit each of a plurality of physiological signals from the subject at a preselected rate, each sample being in the form of a pulse whose amplitude and polarity are related to the physiological signal at the time of sampling;

generating synchronizing pulses in said subject-carried unit;

combining the sample pulses with the synchronizing pulses into a composite wavetrain of pulses of equal durations in which successive synchronizing pulses are separated by at least a set of pulses which includes a sample pulse of each of said physiological signals;

frequency modulating a radio-frequency carrier with the pulses of said composite wavetrain of pulses;

transmitting the frequency modulated radio frequency carrier to a remotely located receiving unit;

extracting at said receiving unit the pulses of said composite wavetrain from the frequency modulated radio frequency carrier; and utilizing at said receiving unit the received synchronizing pulses to form a sequence of local sync pulses of equal durations which are shorter than the durations of the pulses of said composite wavetrain, with the midpoint of each local sync pulse being substantially in time coincidence with the midpoint of a different pulse in said wavetrain; and utilizing said local sync pulses to form an output signal corresponding to each physiological signal from the sample pulses thereof, contained in said composite wavetrain of pulses.

9. The method as described in claim 8 wherein each physiological signal is sampled at a rate which is at least twice as high as its upper frequency limit.

10. The method as described in claim 8 wherein in said receiving unit the local sync pulses are utilized to control the routing of portions of successive sample pulses from the same physiological signal to a different output channel, and holding and filtering the sample pulses in each output channel to produce an output signal therefrom.

11. The method as described in claim 10 wherein each physiological signal is sampled at a rate which is at least twice as high as its upper frequency limit.

* * * * *